(12) United States Patent
Qi et al.

(10) Patent No.: US 8,503,959 B2
(45) Date of Patent: *Aug. 6, 2013

(54) MOBILE WIRELESS COMMUNICATIONS DEVICE WITH DIVERSITY WIRELESS LOCAL AREA NETWORK (LAN) ANTENNA AND RELATED METHODS

(75) Inventors: Yihong Qi, Waterloo (CA); Ying Tong Man, Kitchener (CA); Perry Jarmuszewski, Waterloo (CA); Adrian Cooke, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 275 days.

This patent is subject to a terminal disclaimer.

(21) Appl. No.: 13/038,480

(22) Filed: Mar. 2, 2011

(65) Prior Publication Data

US 2011/0149935 A1    Jun. 23, 2011

Related U.S. Application Data (63) Continuation of application No. 12/015,844, filed on Jan. 17, 2008, now Pat. No. 7,912,435, which is a continuation of application No. 10/924,276, filed on Aug. 23, 2004, now Pat. No. 7,353,013.

(51) Int. Cl.
*H04B 1/40* (2006.01)
*H01Q 11/14* (2006.01)

(52) U.S. Cl.
USPC ............. 455/272; 343/700 MS; 343/741

(58) Field of Classification Search
USPC .......... 455/269, 272, 273, 274, 277.1, 442, 455/552.1, 553.1; 343/702, 741, 742, 743, 343/700 MS
See application file for complete search history.

(56) References Cited

U.S. PATENT DOCUMENTS

| | | | |
|---|---|---|---|
| 5,532,708 A | 7/1996 | Krenz et al. | 343/795 |
| 6,031,503 A | 2/2000 | Preiss, II et al. | 343/770 |
| 6,404,394 B1 | 6/2002 | Hill | 343/702 |
| 6,483,463 B2 | 11/2002 | Kadambi et al. | 343/700 MS |
| 6,549,170 B1 | 4/2003 | Kuo et al. | 343/702 |
| 6,624,790 B1 | 9/2003 | Wong et al. | 343/702 |
| 7,253,779 B2 | 8/2007 | Greer et al. | 343/744 |
| 2002/0101377 A1 | 8/2002 | Crawford | 343/702 |
| 2003/0146876 A1 | 8/2003 | Greer et al. | 343/702 |
| 2004/0017320 A1 | 1/2004 | Yuanzhu | 343/727 |
| 2004/0051669 A1 | 3/2004 | Rutfors et al. | 343/702 |
| 2004/0085245 A1 | 5/2004 | Miyata et al. | 343/700 MS |
| 2005/0070326 A1 | 3/2005 | Morton | 455/552.1 |
| 2005/0212708 A1 | 9/2005 | Fifield | 343/702 |
| 2006/0116127 A1 | 6/2006 | Wilhoite et al. | 455/442 |

FOREIGN PATENT DOCUMENTS

| | | |
|---|---|---|
| EP | 0689301 | 12/1995 |
| EP | 1189304 | 3/2002 |
| JP | 11274827 | 10/1999 |
| JP | 2001352214 | 12/2001 |
| WO | 03063290 | 7/2003 |

*Primary Examiner* — Blane J Jackson
(74) *Attorney, Agent, or Firm* — Allen, Dyer, Doppelt, Milbrath & Gilchrist, P.A.

(57) ABSTRACT

A mobile wireless LAN communications device may include a portable, handheld housing, and a wireless LAN transceiver carried by the housing. A polarization diversity wireless LAN antenna may be included for cooperating with the wireless LAN transceiver to communicate over a wireless LAN. The polarization diversity wireless LAN antenna may include a first antenna element coupled to the wireless LAN transceiver having a first shape and a first polarization, and a second antenna element coupled to the wireless LAN transceiver having a second shape different from the first shape. The second antenna element may also have a second polarization different from the first polarization.

17 Claims, 5 Drawing Sheets

MOBILE WIRELESS COMMUNICATIONS DEVICE WITH DIVERSITY WIRELESS LOCAL AREA NETWORK (LAN) ANTENNA AND RELATED METHODS

FIELD OF THE INVENTION

This application is a continuation of Ser. No. 12/015,844 filed Jan. 17, 2008, now U.S. Pat. No. 7,912,435 issued Mar. 22, 2011, which, in turn, is a continuation of Ser. No. 10/924,276 filed Aug. 23, 2004 now U.S. Pat. No. 7,353,013 issued Apr. 1, 2008, all of which are hereby incorporated herein in their entireties by reference.

BACKGROUND OF THE INVENTION

Computers are often connected together as part of a Local Area Network (LAN). The LAN permits computers to share data and programs with one another. Many typical LANs are based upon physical connections between individual computers and a server, for example. The connections may be twisted pair conductors, coaxial cables, or optical fibers, for example.

There is also another class of LAN based upon wireless communication to the individual computers. A wireless LAN is not restricted to having physical connections to the individual computers. Accordingly, original installation may be simplified. Additionally, one or more of the computers may be used in a mobile fashion. In other words, the user may use a laptop computer and move from place to place while still being connected via the wireless LAN.

Various standards have been created to define operating protocols for wireless LANs, such as the IEEE 802.11 and Bluetooth standards. The IEEE 802.11 standard, for example, defines the protocol for several types of networks including ad-hoc and client/server networks. An ad-hoc network is a network where communications are established between multiple stations in a given coverage area without the use of an access point or server. The standard provides methods for arbitrating requests to use the medium to ensure that throughput is maximized for all of the users in the base service set. Another widely used wireless LAN format is Bluetooth.

The client/server network uses an access point that controls the allocation of transmit time for all stations and allows mobile stations to roam from one access point to another. The access point is used to handle traffic from the mobile radio to the wired or wireless backbone of the client/server network. This arrangement allows for point coordination of all of the stations in the basic service area and ensures proper handling of the data traffic. The access points route data between each station and other wired/wireless stations, or to and from the network server (i.e., a base station). Of course, two or more LANs may be interconnected using wireless LAN devices at respective access points. This may be considered a network bridge application.

One of the challenges of wireless LAN implementation is designing suitable antennas that can provide desired performance characteristics, yet are relatively small in size to fit within mobile devices. For example, with wireless LAN devices such as laptop computers, it is desirable to keep the overall size of the laptop as small as possible. Furthermore, internal antennas are generally preferred over external antennas, as externally mounted antennas take up more space and may be damaged while traveling, etc.

One example of a wireless LAN antenna that is implemented on a PMCIA card to be inserted in a PMCIA slot of a laptop computer is disclosed in U.S. Pat. No. 6,031,503 to Preiss, II et al. The antenna assembly includes two folded, U-shaped antennas, which may be dipoles or slot radiators, that are disposed orthogonally to one another to provide polarization diversity. Polarization diversity means that signals are transmitted and received on two different polarizations to increase the likelihood that the signal is received. Signals are carried to and from the antenna by microstrip feed lines. The microstrip lines are placed off center along each antenna slot to establish an acceptable impedance match for the antenna, and the feed lines are coupled to the communications card by coaxial cables.

There is an increasing trend toward using other portable, handheld communications devices in wireless LANs which are even smaller than laptops, such as personal digital assistants (PDAs), for example. Accordingly, with even more restrictive space constraints for such handheld devices, there is a need for antennas which are appropriately sized for such applications yet still provide desired performance characteristics.

SUMMARY OF THE INVENTION

In view of the foregoing background, it is therefore an object of the present invention to provide a mobile wireless communications device with a wireless LAN antenna providing polarization diversity as well as other desired signal characteristics and related methods.

This and other objects, features, and advantages in accordance with the present invention are provided by a mobile wireless local area network (LAN) communications device including a polarization diversity wireless LAN antenna. More particularly, the mobile wireless LAN communications device may include a portable, handheld housing, and a wireless LAN transceiver carried by the housing. The polarization diversity wireless LAN antenna may be for cooperating with the wireless LAN transceiver to communicate over a wireless LAN. Moreover, the polarization diversity wireless LAN antenna may include a first antenna element coupled to the wireless LAN transceiver having a first shape and a first polarization. The antenna may further include a second antenna element coupled to the wireless LAN transceiver having a second shape different from the first shape and a second polarization different from the first polarization.

The first and second antenna elements may have different gain patterns, and the different gain patterns may have a substantially equal main lobe gain. Further, the first and second polarizations may be substantially orthogonal to one another. At least one of the first and second antenna elements may include a feed branch and a loop branch having a first end coupled to the feed branch, a second end adjacent the feed branch and separated therefrom by a gap, and a loop-back section extending between the first and second ends. More specifically, the feed branch may include first and second feed points. The first end of the loop branch may be coupled to the first feed point, and the second end of the loop branch may be adjacent the second feed point. Also, the loop-back section of the loop branch may include at least one arcuate portion.

A circuit board may be carried by the housing having first and second opposing major surfaces. The first and second antenna elements may be planar conductive elements on the first major surface of the circuit board. In addition, a matching network may be coupled between the wireless LAN transceiver and the at least one of the first and second antenna elements. The mobile wireless LAN communications device may also include a cellular transceiver carried by the portable, handheld housing, and a cellular antenna for cooperating with the cellular transceiver to communicate over a cellular communications network.

A wireless LAN communications method aspect of the invention may include providing a polarization diversity wireless LAN antenna, such as the one described briefly above, and communicating signals over a wireless LAN via the first antenna element at a first polarization, and via the second antenna element at a second polarization different from the first polarization.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

Figure 1:
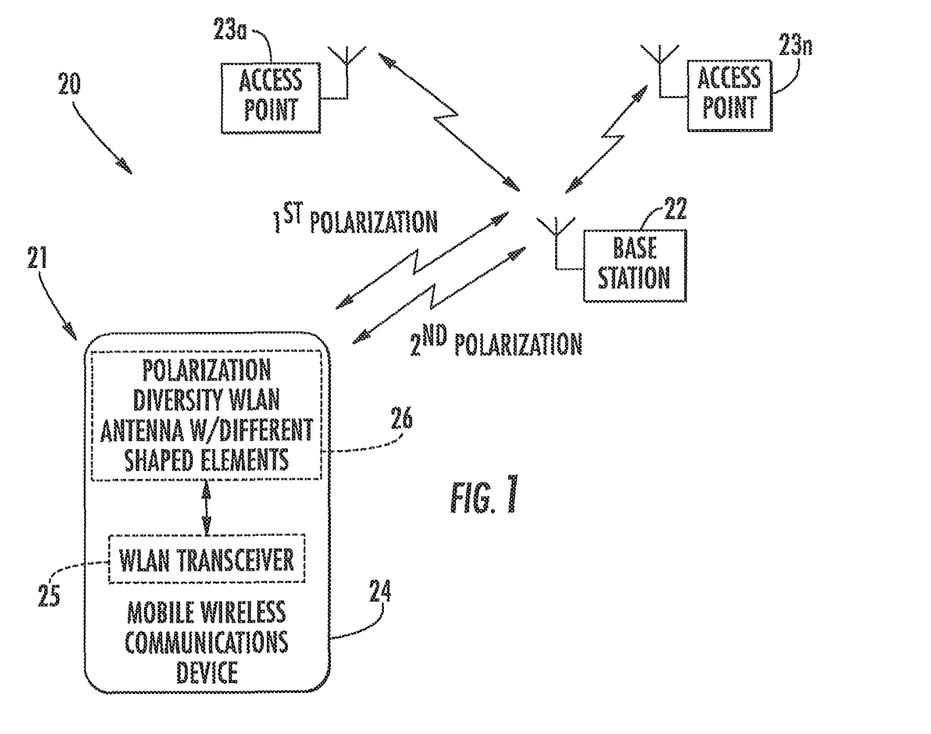
FIG. 1 is schematic block diagram of a wireless local area network (LAN) including a mobile wireless communications device in accordance with the present invention.

Referring initially to FIG. 1, a wireless local area network (LAN) 20 including a mobile wireless communications device 21 in accordance with the present invention is first described. The wireless LAN 20 also illustratively includes a base station 22, and a plurality of access point devices 23a-23n, which may be any type of wireless LAN enabled devices (including other mobile wireless communications devices 21), as will be appreciated by those skilled in the art. While only the single base station 22 is shown for clarity of illustration, multiple base stations may be included in some embodiments. The wireless LAN 20 may operate in accordance with various wireless LAN standards, such as IEEE 802.11/802.11b or Bluetooth, for example, as will also be appreciated by those skilled in the art.

The mobile wireless communications device 21 illustratively includes a portable, handheld housing 24, and a wireless LAN transceiver 25 carried by the portable, handheld housing. The device 20 also illustratively includes a polarization diversity wireless LAN antenna 26 for cooperating with the wireless LAN transceiver 25 to communicate over the wireless LAN 20, as will be discussed further below. More particularly, the device 20 may be a PDA-type device in which the wireless LAN transceiver and antenna 26 cooperate to communicate various types of data, such as voice data, video data, text (e.g., email) data, Internet data, etc. over the wireless LAN 20. More specifically, the antenna 26 may be used for placing telephone calls over the wireless LAN 20, in which case the device 21 may generally take the form or shape of a typical cellular telephone or a cellular-enabled PDA device, for example.

Figure 2:
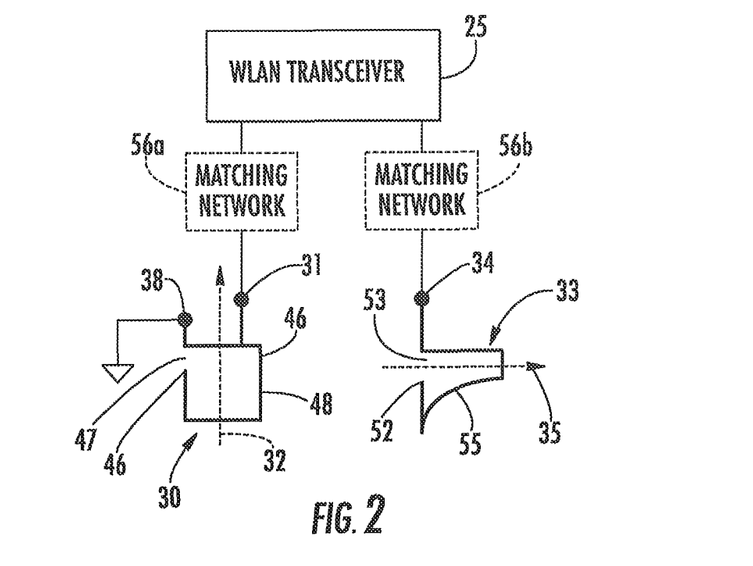
FIG. 2 is a more detailed schematic block diagram of the wireless LAN transceiver and polarization diversity antenna of the mobile wireless communications device of FIG. 1.
Figure 3:
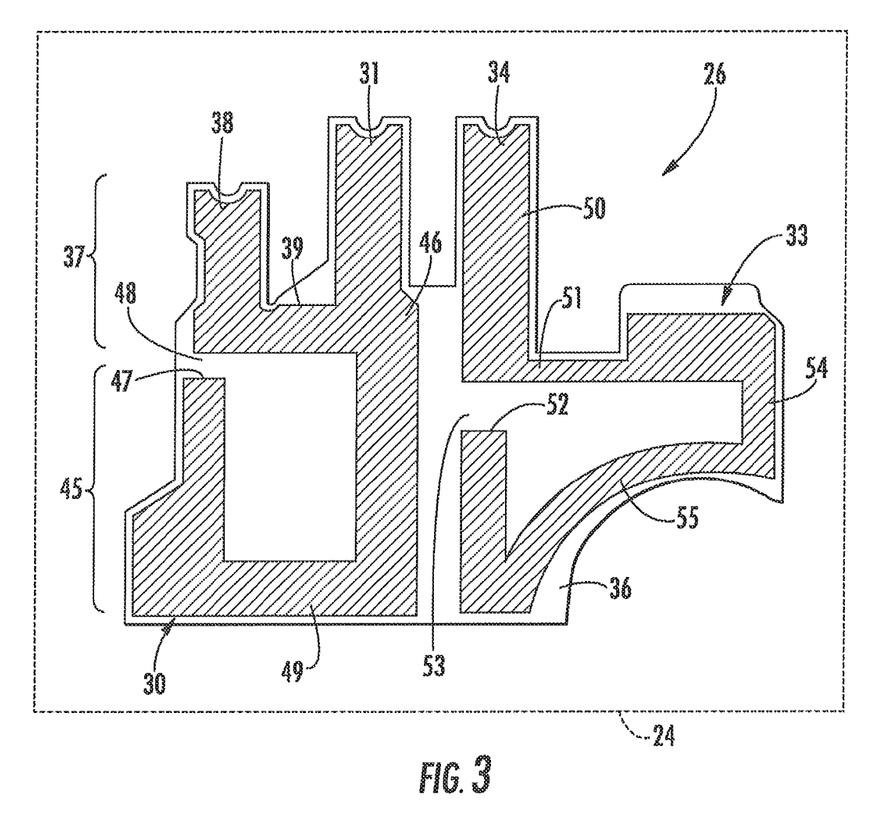
FIG. 3 is an enlarged rear elevational view of a portion of the mobile wireless communications device of FIG. 1 with the housing removed illustrating the polarization diversity antenna thereof in greater detail.

Turning additionally to FIGS. 2 and 3, the polarization diversity wireless LAN antenna 26 illustratively includes a first antenna element 30 coupled to the wireless LAN transceiver 25 at a feed point 31 and having a first shape and a first polarization. More particularly, the peak antenna gain for the first antenna element 30 is directed normal to the plane thereof, and the polarization of the element is a substantially vertical polarization, as illustrated with a dashed arrow 32.

The antenna 26 also illustratively includes a second antenna element 33 coupled to the wireless LAN transceiver 25 at a feed point 34. The second antenna element 33 has a second shape different from the first shape of the first antenna element 30. Furthermore, the second antenna element 33 also has a second polarization different from the first polarization. In particular, the peak antenna gain for the second antenna element 33 is also directed normal to the plane thereof, and its polarization is a substantially horizontal polarization, as illustrated with a dashed arrow 35. That is, the polarizations of the first and second antenna elements 30, 33 are preferably orthogonal to one another, as shown, to provide maximum polarization diversity, as will be appreciated by those skilled in the art. Of course, other arrangements may be possible in other embodiments.

The first and second antenna elements 30, 33 may advantageously be implemented as planar, printed conductive elements on a circuit board 36. The circuit board may be mounted on the back side of the device 21 (i.e., the side pointing away from the user when holding the device to place a telephone call) at the top of the device (i.e., adjacent the end of the device with the ear speaker). The first and second antenna elements 30, 33 are shown with hatching to provide greater clarity of illustration. Moreover, it should also be noted that the illustration of the first and second antenna elements 30, 33 shown in FIG. 2 is merely schematic in nature, with the actual layouts of these elements being shown in greater detail in FIG. 3. The first antenna element 30 illustratively includes a feed branch 37 including the first feed point 31, a second feed point 38 which is connected to ground (FIG. 2), and a feed section 39 connected between the first and second feed points.

The first antenna element 30 further illustratively includes a loop branch 45 having a first end 46 coupled to the feed section 39 adjacent the first feed point 31. A second end 47 of the loop branch 45 is spaced apart from the feed section 39 by a gap 48, and the second end is adjacent the second feed point 38. A loop-back section 49 extends between the first and second ends 46, 47. More specifically, the loop-back section 49 generally loops in a clockwise direction from the first end 46 to the second end 47, as shown. The first antenna element 30 thus generally defines a dual feed point, open loop configuration. This configuration advantageously provides increased space savings (i.e., reduced antenna footprint), as will be appreciated by those skilled in the art.

The second antenna element 33 also illustratively includes a feed branch defined by the feed point 34 and a feed section 50. Further, a loop branch having a first end 51 coupled to the feed section 50, a second end 52 adjacent the feed branch and separated therefrom by a gap 53, and a loop-back 54 section extending between the first and second ends. The loop-back section 54 illustratively includes an arcuate portion 55. The second antenna element 33 thus defines a single feed point, open loop element configuration. Again, this provides space savings, and, thus, reduced antenna footprint.

As will be appreciated by those skilled in the art, various design parameters (e.g., widths, lengths, loop shapes, notches, etc.) may be altered in the first and second antenna elements 30, 33 to provide different signal characteristics. By way of example, the overall dimensions of the first and second antenna elements 30, 33 may be 2 to 3 cm high by 2 to 3 cm wide for each element, although other dimensions may also be used. The elements 30, 33 preferably operate over a wireless LAN frequency range of about 2.4 to 2.5 GHz, for example, although other frequencies are also possible. Moreover, the coupling between the first and second elements 30, 33 may also be adjusted to provide desired performance characteristics. By way of example, a preferred coupling distance or gap between the first and second elements 30, 33 may be in a range of about 3 to 7 mm, although other gap distances may also be used as appropriate for different embodiments.

Because the first and second antenna elements 30, 33 have different shapes, they will also have different gain patterns, and thus advantageously provide pattern diversity, as will be appreciated by those skilled in the art. Moreover, the first and second antenna elements 30, 33 are preferably tuned to have substantially equal main lobe gain for enhanced performance. Of course, it will be appreciated that other antenna element shapes or types may be used in addition to those noted above. Matching networks 56a, 56b may optionally be coupled between the wireless LAN transceiver 25 and the first and second antenna elements 30, 33, respectively, as shown in FIG. 2, if desired, as will be appreciated by those skilled in the art. Moreover, electromagnetic shielding may be placed aver one or both sides of the circuit board 36 as necessary in certain applications, as will also be appreciated by those skilled in the art.

Figure 4:
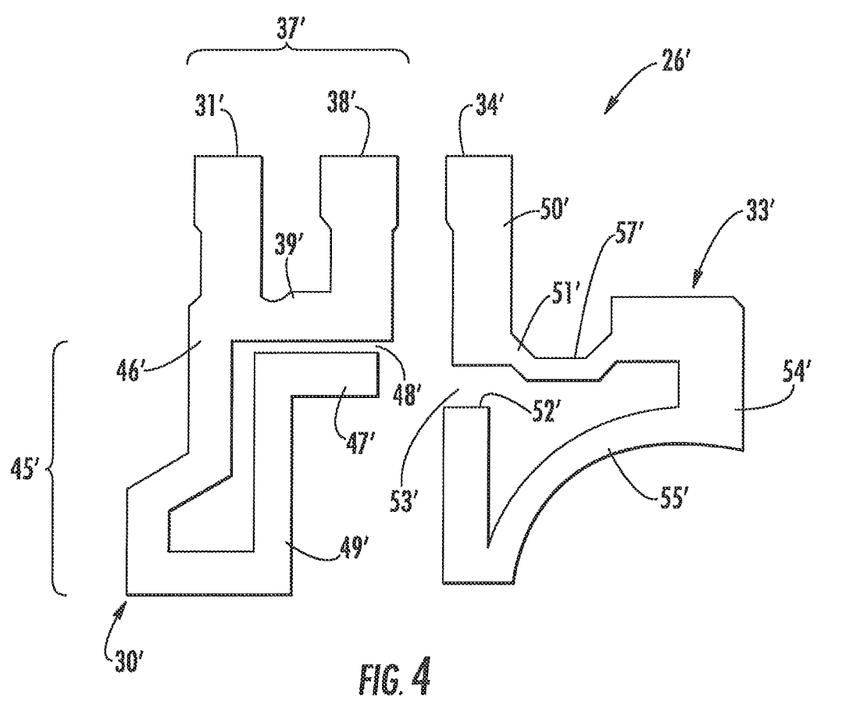
FIG. 4 is an enlarged rear elevational view of an alternate embodiment of the conductors of the polarization diversity antenna of FIG. 3.

An alternate embodiment of the polarization diversity wireless LAN antenna 26' is shown in FIG. 4. Here, the first and second feed points 31', 38' of the first antenna element 30' are flipped left to right, and the loop-back section 45' loops back in a generally counterclockwise direction, as shown, in contrast to the first antenna element 30. The second antenna element 33 is substantially the same shape as described above, except that the end of the loop-back section 54' near the first end 51' has an offset portion 57'.

Figure 5:
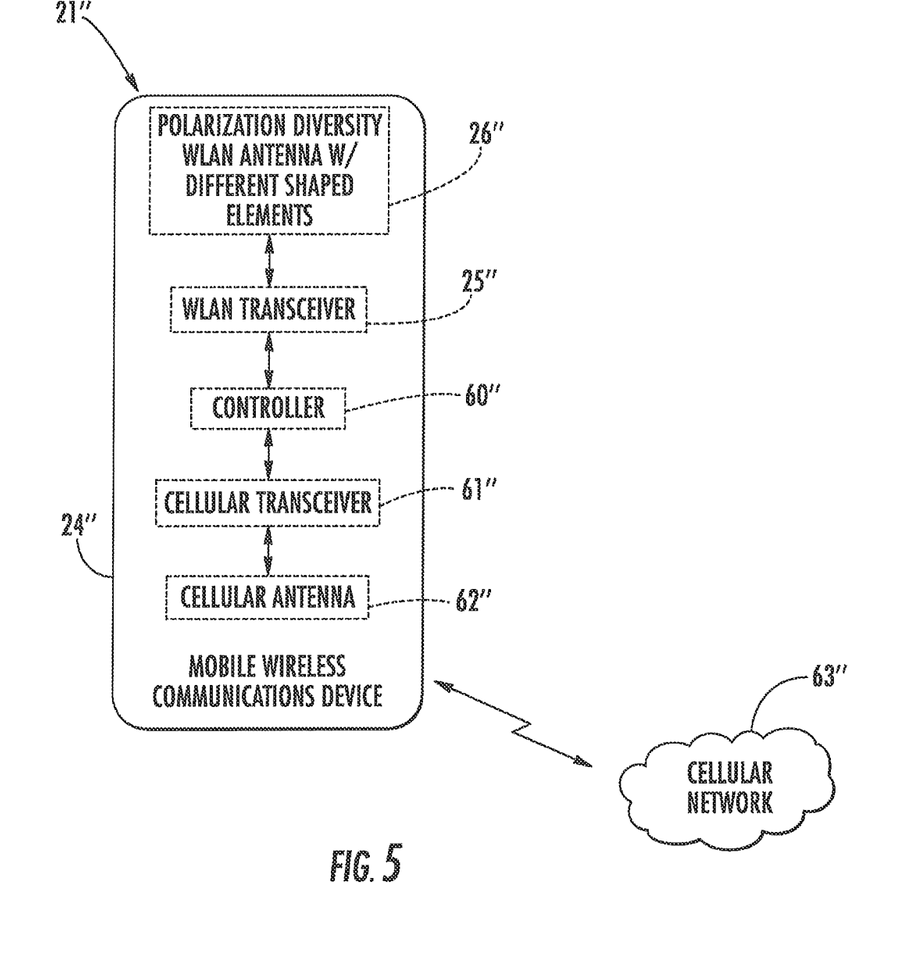
FIG. 5 is schematic block diagram of an alternate embodiment of the mobile wireless communications device of FIG. 1.

Turning additionally to FIG. 5, an alternate embodiment of the mobile wireless communications device 21" further illustratively includes a controller 60", a cellular transceiver 61", and a cellular antenna 62" all carried by the portable, handheld housing 24". The cellular antenna 62" and cellular transceiver 61" cooperate to communicate data such as voice data, text (e.g., email) data, video data, Internet data, etc., over a cellular communications network 63", as will be appreciated by those skilled in the art. The controller 60" advantageously interfaces with the wireless LAN and cellular transceivers 25", 61" for coordinating the communication of such data over the wireless LAN 20 (FIG. 1) and/or the cellular network 63". The controller 60" may be implemented with a microprocessor and various software modules (e.g., email module, telephone module, calendar module, address book module, etc.), as will be discussed further below.

A wireless LAN communications method aspect of the invention may include providing the polarization diversity wireless LAN antenna 26, as described above, and communicating signals over the wireless LAN 20 via the first antenna element 30 at a first polarization, and via the second antenna element 33 at a second polarization different from the first polarization. Additional method aspects will be appreciated by those skilled in the art from the foregoing description.

Another example of a handheld mobile wireless communications device 1000 that may be used in accordance with the present invention is further described with reference to FIG. 6. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 6:
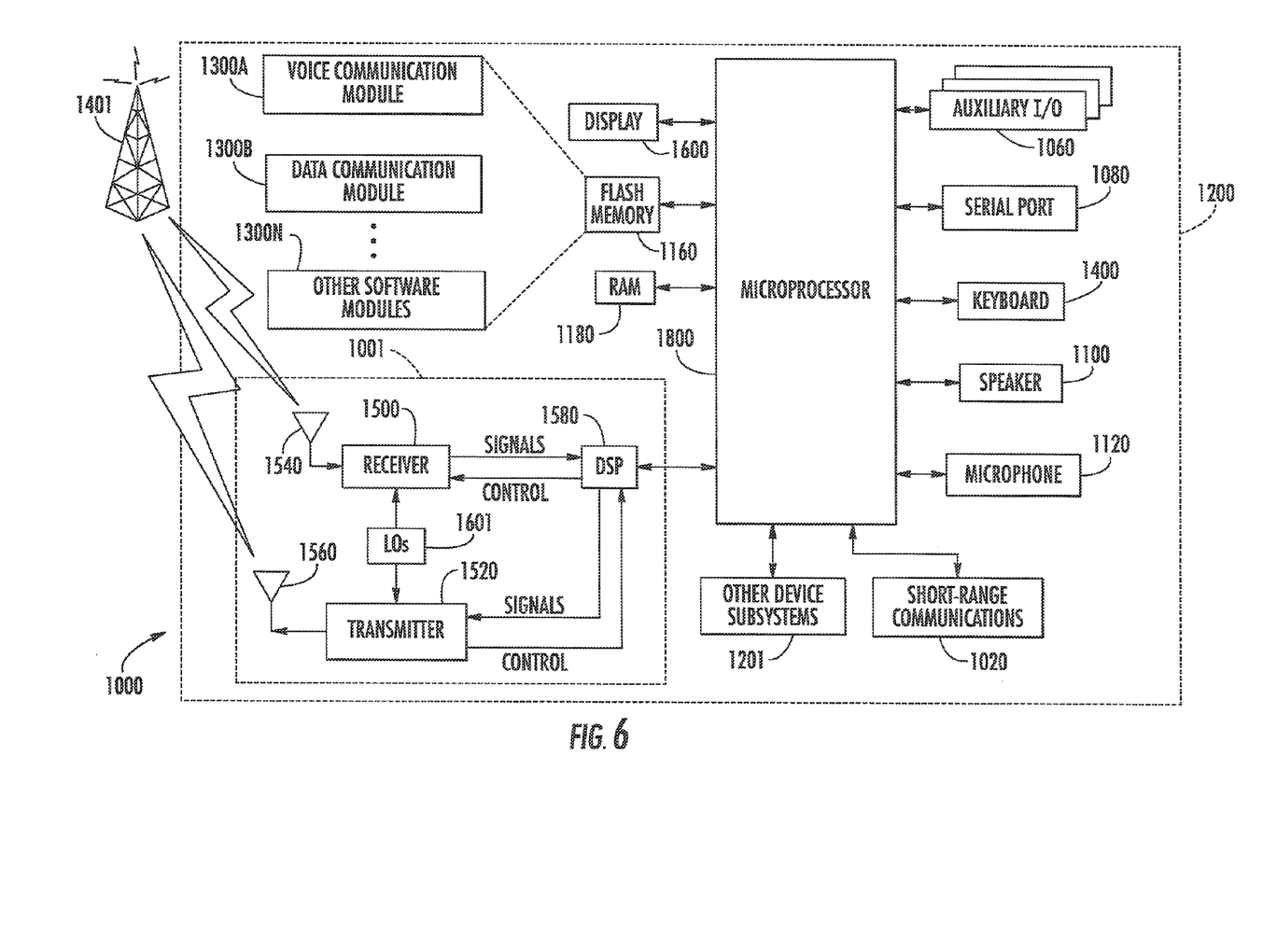
FIG. 6 is a schematic block diagram of an exemplary mobile wireless communications device for use with the present invention.

In addition to the processing device 1800, other parts of the mobile device 1000 are shown schematically in FIG. 6. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are them provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a housing;
a wireless LAN transceiver carried by said housing; and
a wireless LAN antenna coupled to said wireless LAN transceiver and comprising
a first antenna element and a second antenna element each comprising a respective feed branch and a respective loop branch having a first end coupled to said feed branch, a second end adjacent said feed branch and separated therefrom by a respective gap, and a respective loop-back section extending between the first and second ends,
at least respective loop-back sections of said first and second antenna elements having different shapes providing different polarizations for said first and second antenna elements.

2. The electronic device of claim 1 wherein said first and second antenna elements have different gain patterns, and wherein the different gain patterns have a substantially equal main lobe gain.

3. The electronic device of claim 1 wherein said loop-back section of said second antenna element comprises at least one arcuate portion.

4. The electronic device of claim 1 further comprising:
a cellular transceiver carried by said housing; and
a cellular antenna coupled to said cellular transceiver.

5. The electronic device of claim 1 further comprising a circuit board carried by said housing and having first and second opposing major surfaces; and wherein said first and second antenna elements comprise planar conductive elements on the first major surface of said circuit board.

6. The electronic device of claim 1 further comprising a matching network coupled between said wireless LAN transceiver and at least one of said first and second antenna elements.

7. An electronic device comprising:
a circuit board;
a wireless LAN transceiver carried by said circuit board; and
a wireless LAN antenna coupled to said wireless LAN transceiver and comprising
electrically conductive traces on said circuit board defining a first antenna element and a second antenna element each comprising a respective feed branch and a respective loop branch having a first end coupled to said feed branch, a second end adjacent said feed branch and separated therefrom by a respective gap, and a respective loop-back section extending between the first and second ends,
at least respective loop-back sections of said first and second antenna elements having different shapes providing different polarizations for said first and second antenna elements.

8. The electronic device of claim 7 wherein said first and second antenna elements have different gain patterns, and wherein the different gain patterns have a substantially equal main lobe gain.

9. The electronic device of claim 7 wherein said loop-back section of said second antenna element comprises at least one arcuate portion.

10. The electronic device of claim 7 further comprising:
a cellular transceiver carried by said circuit board; and
a cellular antenna coupled to said cellular transceiver.

11. The electronic device of claim 7 further comprising a matching network coupled between said wireless LAN transceiver and at least one of said first and second antenna elements.

12. A wireless LAN antenna for a wireless LAN transceiver comprising:
a first antenna element and a second antenna element each comprising a respective feed branch and a respective loop branch having a first end coupled to said feed branch, a second end adjacent said feed branch and separated therefrom by a respective gap, and a respective loop-back section extending between the first and second ends;
at least respective loop-back sections of said first and second antenna elements having different shapes providing different polarizations for said first and second antenna elements.

13. The wireless LAN antenna of claim 12 wherein said first and second antenna elements have different gain patterns, and wherein the different gain patterns have a substantially equal main lobe gain.

14. The wireless LAN antenna of claim 12 wherein said loop-back section of said second antenna element comprises at least one arcuate portion.

15. A method making a wireless LAN antenna for a wireless LAN transceiver comprising:
forming a first antenna element and a second antenna element each comprising a respective feed branch and a respective loop branch having a first end coupled to the feed branch, a second end adjacent the feed branch and separated therefrom by a respective gap, and a respective loop-back section extending between the first and second ends; and
forming at least respective loop-back sections of the first and second antenna elements having different shapes providing different polarizations for the first and second antenna elements.

16. The method of claim 15 wherein said first and second antenna elements have different gain patterns, and wherein the different gain patterns have a substantially equal main lobe gain.

17. The method of claim 15 wherein said loop-back section of the second antenna element comprises at least one arcuate portion.

\* \* \* \* \*